United States Patent [19]
Ireland

[11] Patent Number: 6,044,796
[45] Date of Patent: Apr. 4, 2000

[54] APPARATUS FOR SEPARATING SEEDS FROM HUSKS

[76] Inventor: Richard Douglas Ireland, 293 Fitzherbert Avenue, Palmerston North, New Zealand

[21] Appl. No.: 09/073,261

[22] Filed: May 6, 1998

[51] Int. Cl.[7] .................................................. A01K 39/01
[52] U.S. Cl. ........................ 119/52.2; 119/475; 209/640; 209/656
[58] Field of Search .................................. 119/52.1, 52.2, 119/52.3, 464, 475; 209/637, 640, 656

[56] References Cited

U.S. PATENT DOCUMENTS

| 159,853 | 2/1875 | Staniford . | |
|---|---|---|---|
| 180,838 | 8/1876 | Buzby . | |
| 3,919,977 | 11/1975 | Clark | 119/52.2 X |
| 5,259,510 | 11/1993 | Lowe et al. | 209/640 X |

FOREIGN PATENT DOCUMENTS

WO 87/07187  12/1987  WIPO .

*Primary Examiner*—Robert P. Swiatek
*Attorney, Agent, or Firm*—Young & Thompson

[57] ABSTRACT

Apparatus for separating seed from husks which consists of one or more separating units. Each separating unit includes a series of impact plates fixed at angles with respect to each other and to the vertical axis. In use, the seed and husks fall freely under gravity to impact and deflect off the impact plates along a path determined by the angles of the plates and the weight of the seed and husks. The deflection path differs such that seed and husks can be collected separately.

24 Claims, 7 Drawing Sheets

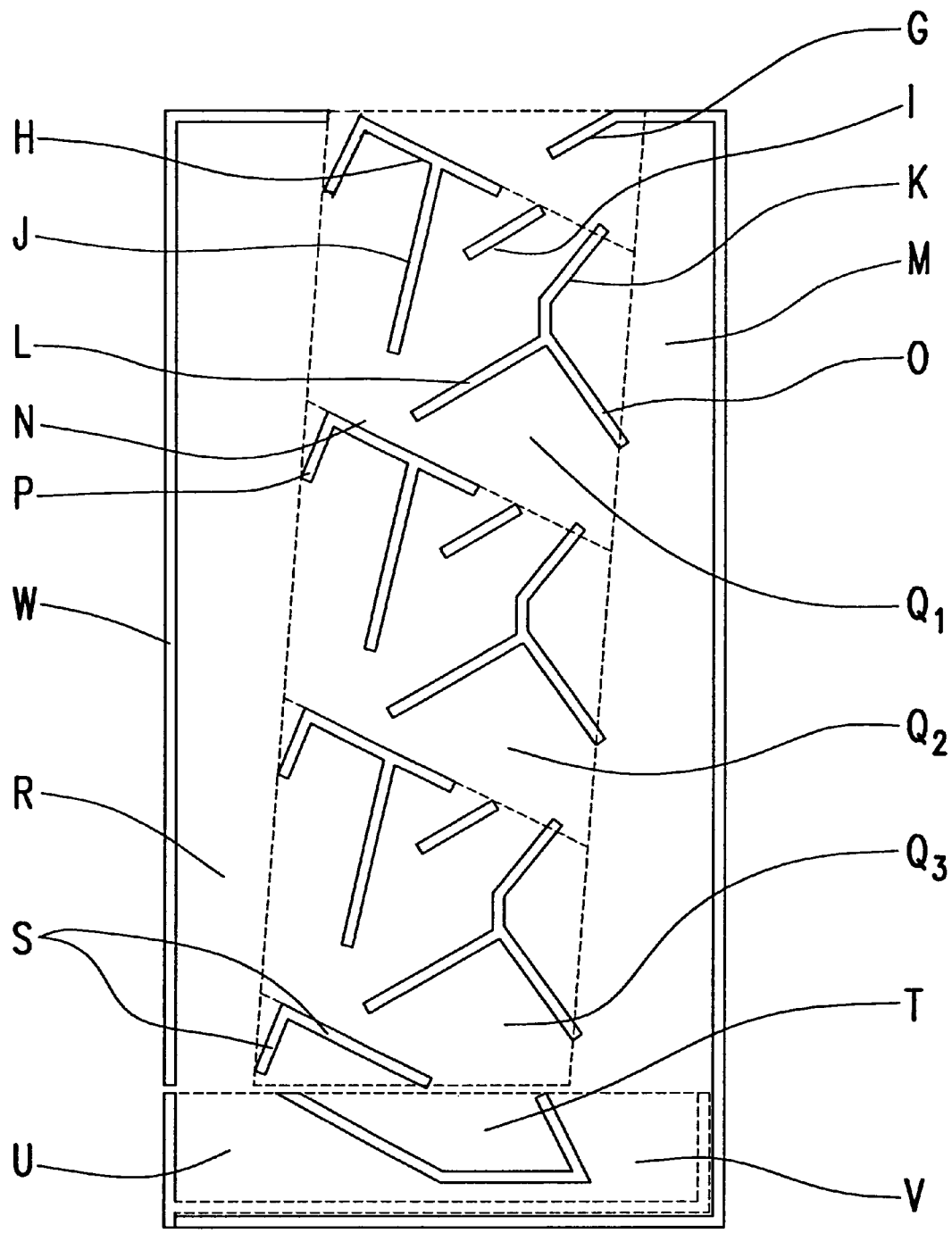
F I G . 2

APPARATUS FOR SEPARATING SEEDS FROM HUSKS

BACKGROUND OF THE INVENTION

This invention relates to improvements in bird seed dispensers, in particular to an apparatus for reclaiming seed from husks.

Some species of birds such as Love Birds have wasteful eating habits. Their animated movements in eating and de-husking the seed lead to a significant percentage of seed being scattered around. Unless the seed dispenser is adapted to collect the seed in some way as it is scattered, this seed falls to the bottom of the cage or aviary and becomes difficult to reclaim. Even if the scattered seed is collected, for example on a tray beneath the dispenser, it will be mixed with husks which are inconvenient to remove so that the seed can be reused.

Furthermore, eye problems such as granulomas have been known to result from small pieces of husk becoming lodged on the surface of the eye of a person attempting to blow the husks away, resulting in the need for specialist eye treatment.

Therefore with known dispensers large amounts of seed can be wasted or are difficult to reclaim in a satisfactory manner. In the case of aviaries, seed scattered on the ground can attract mice which can prey on the birds or bring disease.

In addition to the abovementioned problems encountered, known dispensers do not provide any way to collect information on the dietary habits of the birds (analysing what seeds are popular with the birds). It is also difficult to feed controlled diets to one population of birds in a mixed aviary as all birds have access to the food.

SUMMARY OF THE INVENTION

It is an object of the present invention to go some way towards providing an effective means of separating seed from husks and other contamination, thereby enabling the reclaiming of uneaten seed.

In a broad aspect the present invention provides an apparatus for separating seed from husks consisting of a separating means which is coupled to a collecting means, said separating means consisting of at least one separating unit, the separating unit comprised of a series of impact plates fixed at angles with respect to each other and to the vertical axis such that in use seed and husks falling freely under gravity impact and deflect off said impact plates along a path determined by the angles of the plates and the weight of the seed and husks, causing said path to differ such that seed and husks are collected separately in said collecting means.

In a preferred aspect of the invention the dispensing means is substantially enclosed against the weather but allows the bird easy access to the seed through a porch-like opening to the enclosure. Said opening can include an adjustable aperture system (of plates with different sized openings which admit only birds of a certain size). Preferably the seed is presented to the bird in a trough within the enclosure which is continuously refilled from a hopper above the trough by gravity. The hopper preferably has a lid with a weather-tight seal and is large enough to supply a reasonable amount of seed (the rate at which seed is used will depend on the number and appetite of the birds).

In another preferred aspect of the invention the coupling surface between the dispensing means and the separating means consists substantially of a grid (with a weather resistant seal) which forms the floor of the dispensing means and the roof of the separating means or collecting means. Preferably the size and shape of the apertures in the grid are such as to allow seed and husks to pass through easily yet small enough so that the bird is not averse to walking on the surface. As an alternative to the grid a perch may be positioned at a convenient distance from the trough, this arrangement allowing free fall of the scattered seed and husks down into the separating means yet still providing the bird with a secure means of resting while feeding.

According to a further preferred aspect of the invention the separating means is divided into separate substantially similar separation modules which can be disassembled from one another to aid cleaning. Said separation modules consist of a series of plates fixed to each other and to a frame at predetermined angles with respect to each other and to the vertical. The angles and plate clearances of a given separation module suit it to the seed type the bird is fed (i.e. there is a different configuration of the separation means for sunflower seeds than that of wheat etc.). This is by virtue of the weight/density/shape (and hence bouncing) characteristics of the varying seed types. Although a single separating unit is capable of performing a degree of separation between seed and husks free falling through the unit, it is preferred that at least two units are used in a linear arrangement such that seed and husks fall through each unit in turn leading to a high level of accumulated separation before being collected in the collecting means.

In yet another preferred aspect of the invention the separating means consists of an enclosed housing in which each separation module may be removably encased above the preceding unit in linear array, the uppermost unit lying directly beneath the base of the dispensing means through which scattered seed and husks fall. It has been found by experiment that the arrangement of the impact plates in each separation module according to the present invention results in seed being deflected laterally away from the module towards the walls of the housing, whereas the lighter and softer husks are much less deflected and continue to fall within the confines of the modules. Accordingly the modules are encased in the enclosed housing such that there is a clear channel running down the length of the housing on either side of the stack of modules through which deflected seed may fall towards the collecting means. It has further been found that the best separation of some seed types is achieved when the longitudinal axis of the stacked modules is at a slight angle to the vertical.

In yet a further preferred aspect of the invention the collecting means consists of a tray with separate compartments for collecting the seed and husks that have fallen through the separating means, the tray being removably engaged below the lowermost end of the separating means. The compartments for collecting the seed are positioned directly below each of the clear channels running on either side of the stack of separation modules, whereas the compartment for collecting the husks is positioned directly below the stack of separation modules. Preferably the lateral walls of the compartments are positioned such that when the tray is removed to be emptied, the seed and husks may be emptied separately.

BRIEF DESCRIPTION OF THE DRAWINGS

The present invention will now be described by particular embodiments with reference to the following drawings in which:

FIG. 2 is a cross-sectional view of the separating means engaged with the collecting means, through the vertical axis;

DESCRIPTION OF THE PREFERRED EMBODIMENTS

Figure 1:
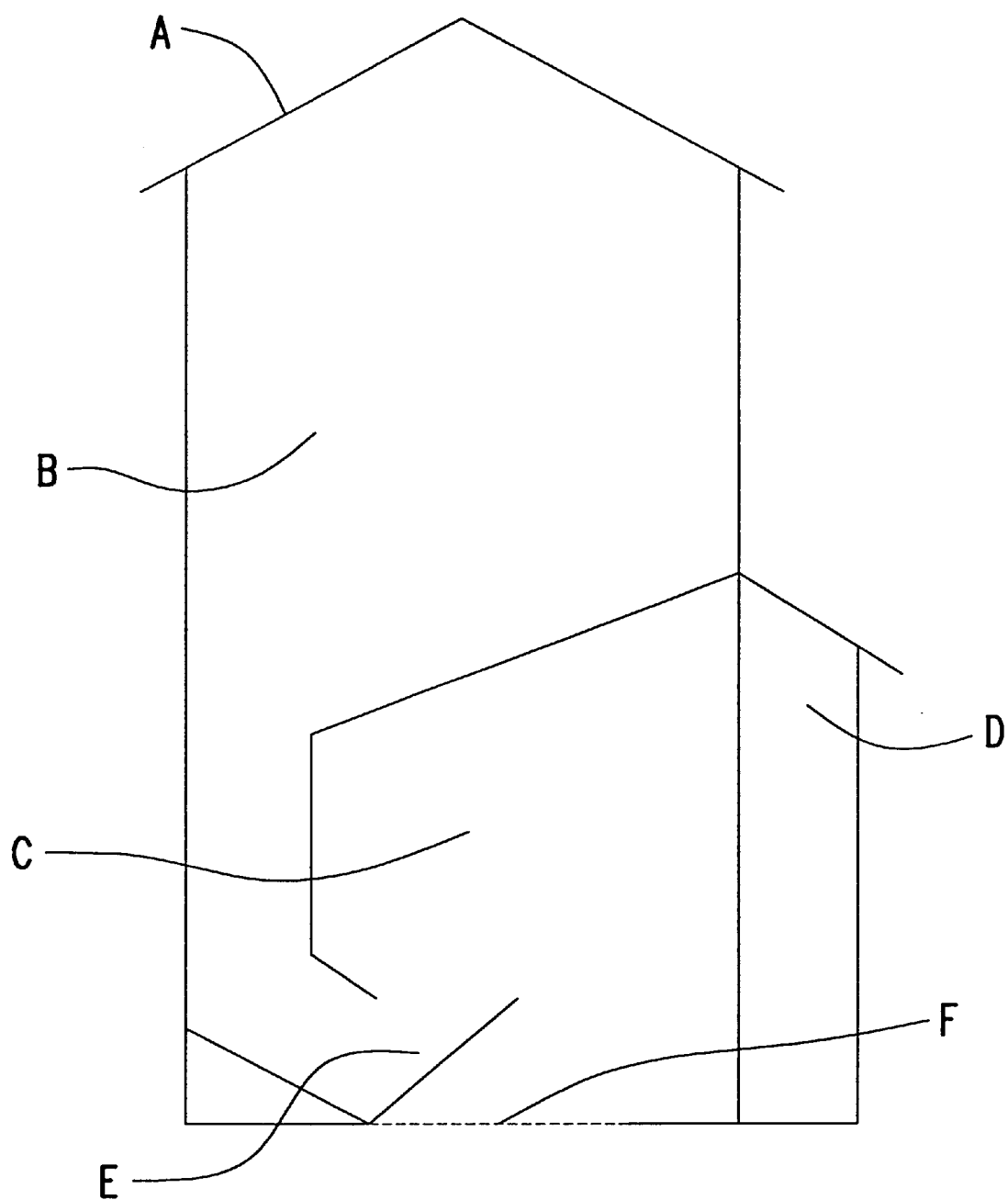
FIG. 1 is a cross-sectional view of dispensing means through the vertical axis.
Figure 3:
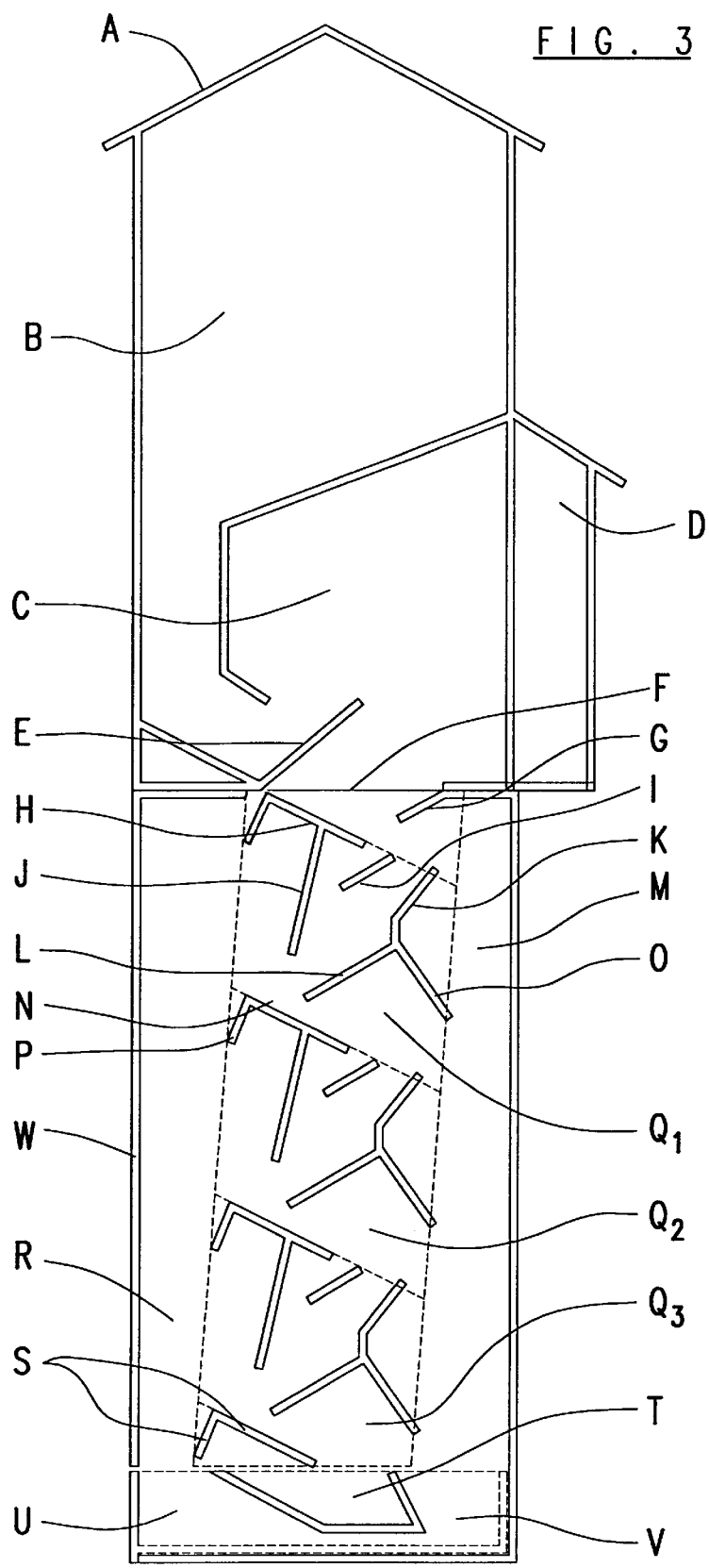
FIG. 3 is a cross-sectional view of the fully assembled apparatus through the vertical axis.

According to a particular embodiment of the invention there is provided an apparatus as shown in FIGS. 1,2 and 3 for dispensing bird seed while at the same time reclaiming scattered seed substantially free of husks and other contaminations. The apparatus consists of three sections which are removably coupled or engaged with each other in order to perform their function and for ease of cleaning.

The first section of the apparatus is the dispensing section as shown in FIG. 1. This section consists of a hopper B with lid A, a feeding enclosure C opening out to a detachable porch D, and a trough E at which the bird feeds while standing on grid F. Hopper B is preferably large enough to hold about a month's supply of seeds such as Sunflower Seed, Barley or Millet for a few small birds which equates to a volume of approximately 2.5 liters. There is a seal against the weather between hopper B and lid A. Porch D and feeding enclosure C provide a welcoming and safe environment for the bird to feed. Transparent materials such as transparent Perspex, polyethylene or polycarbonate are the materials of choice for making the dispensing section since the bird is still able to look around while feeding and does not feel like it is being trapped. Extrusions together with an injection moulding or thermoforming operation are likely to be used for manufacture.

As shown in a first embodiment in FIG. 1 hopper B and trough E are connected such that seed removed from trough E is immediately replenished by seed from hopper B above falling under gravity. While the bird is feeding, spilt seed and discarded husks fall to the floor of enclosure C and pass through the apertures of grid F to enter the second section of the present apparatus, the separating section, as shown in FIGS. 2 and 3. The rim of trough E and the position of grid F are such that the majority of spilt seed and husks falling into the separating section make as their first point of impact plate H, with a lesser amount impacting plate G.

From plate G seed bounces or slips onto plate H and sufficient speed has been reached upon reaching plate H to enable seed to bounce towards plate I. Since seed has greater weight and therefore greater momentum than husks, it tends to be deflected to a greater degree than husks. Some of the seed bouncing off plate I will be deflected toward plate J, and some will be deflected over the top of plate I toward plate K.

Some seed bouncing off plate H will have sufficient momentum to bounce directly onto plate K. Seed bouncing off plate K will either be deflected to plate L, or if it has gained sufficient momentum it will be deflected over the top of plate K into channel M. The latter seed is prevented from re-entering the separation unit by plate O and will finally come to rest in collection chamber V.

The remaining seed still in the first separation module $Q_1$ is deflected off plates J and L and focused toward plate N of the second separation module $Q_2$. At this point some of the seed bounces far enough that it bounces over the top edge of plate N into collection channel R. This seed is prevented from re-entering the system by plate P or J finally coming to rest in collection chamber U. At plate N the seed that is not ejected into either of channels M or R, together with the husk, repeat the same cycle described above as they fall through the second and further separation modules $Q_2$ and $Q_3$. A final opportunity for separation occurs at plate S which is fixed to housing W (or alternatively chamber T of the collecting means) instead of being part of the last separation module $Q_3$. No further separation occurs beyond this point as the mainly husk material that remains in the unit $Q_3$ is collected in chamber T.

Figure 4:
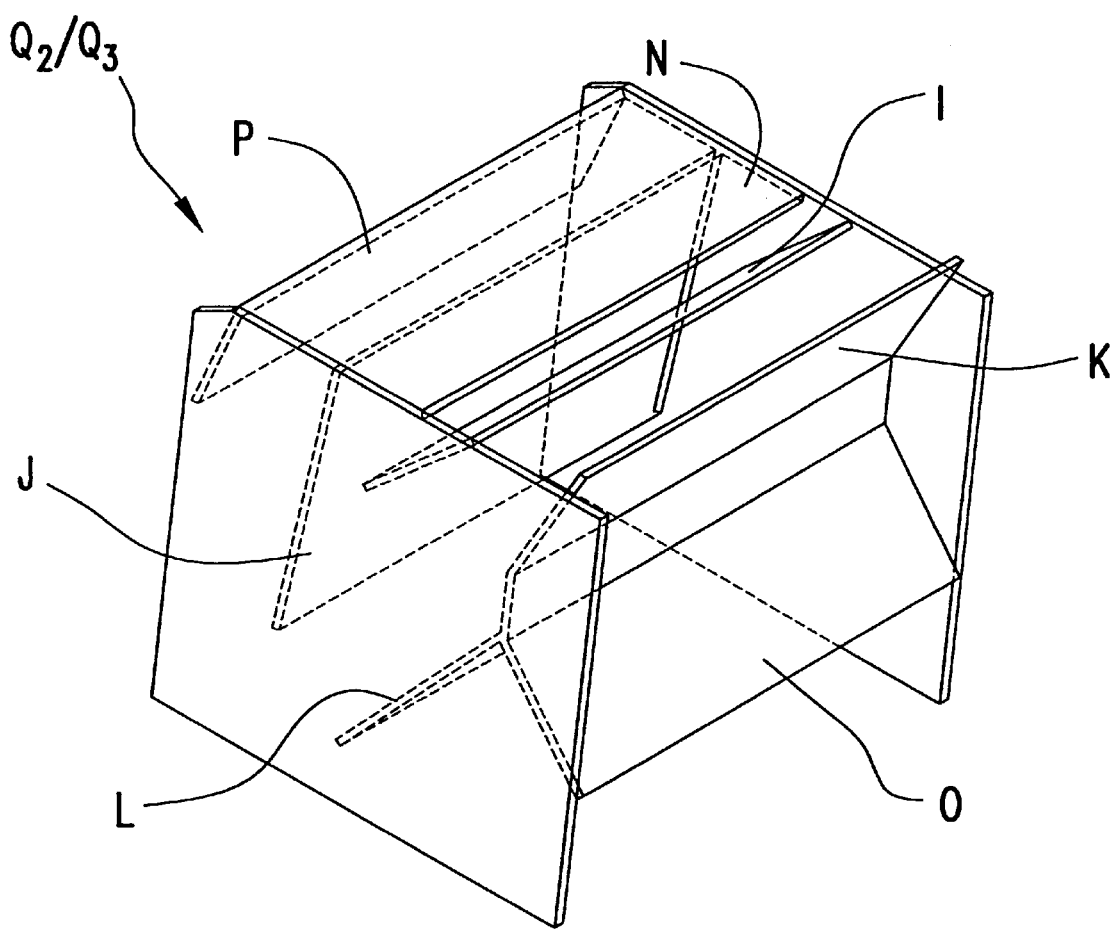
FIG. 4 is a general view of one of the repeated separating modules as shown in FIG. 2 and 3.

FIG. 4 shows the construction of the repeated separation modules $Q_1$, $Q_2$ and $Q_3$. The modules are substantially identical in this embodiment for ease of manufacture.

Collection chambers U, V and T form the third section of the apparatus. As shown in FIG. 2, chambers U and V are connected with each other such that the collected seed may be tipped from chamber U to V when the seed is being poured back into hopper B for reuse. Chamber T is formed such that in tipping seed out of chamber V, the husks collected in chamber T are retained in the chamber. Once chambers U and V have been emptied, chamber T can be emptied of its contents and the collecting section reinstalled on the apparatus. Alternatively, chamber T may be separated from the collecting section and the husks discarded separately.

The following table illustrates by way of example the dimensions of the impact plates and the angles they form with respect to the horizontal in a clockwise direction.

| Plate | Angle to the Horizotal | Length in mm |
| --- | --- | --- |
| G | 150° | 25 |
| H/N | 27° | 45 |
| I | 150° | 25 |
| J | 103° | 55 |
| K | 130° | 25 |
| L | 150° | 40 |
| O | 60° | 35 |
| P | 117° | 20 |

Figure 5:
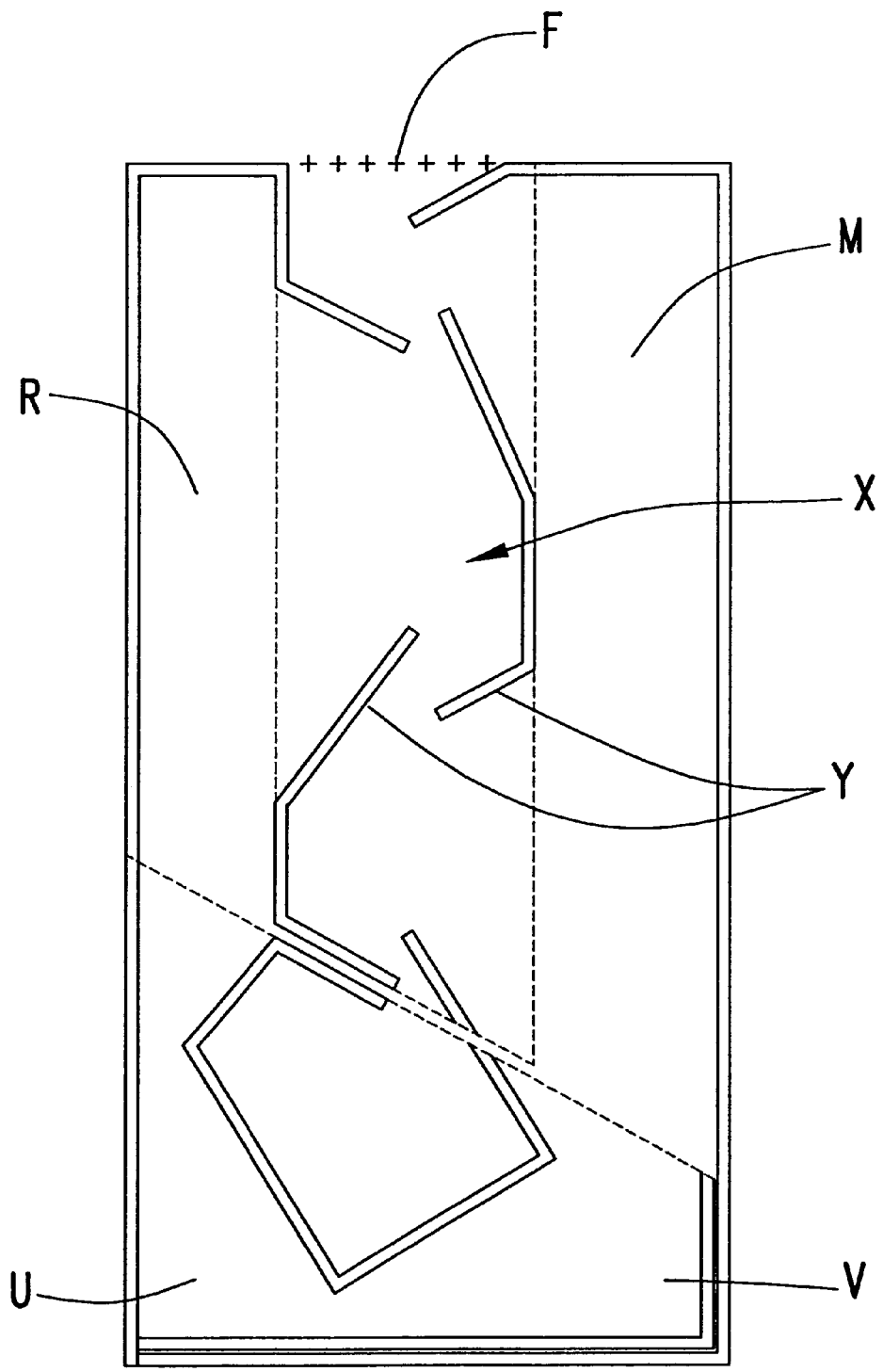
FIG. 5 is a cross-sectional view of a separating means for use with larger seed types.

FIG. 5 illustrates a further embodiment of the invention—a separation means for separating larger seed types such as sunflower seeds. The separation portion is best constructed as a single unit X (instead of individual modules) because of the overlapping of the plates Y. Unit X is removed from its channel for cleaning as the modules $Q_1$, $Q_2$ and $Q_2$ from the previous embodiment are. The accessibility of plates Y allows unhindered cleaning of single unit X.

The altered construction of FIG. 5 is necessary because of the different density and shape (affecting bouncing) of the larger seeds. The principle remains exactly the same with husks being deflected into channels R or M or falling down plates Y and ending up in either of receptacles T (for husks) or U/V (for reusable seed).

It will be appreciated from the above description that the seed dispenser/separator of the present invention has wide application not only as a dispenser for birds but also for other seed eating animals such as rodents. Since the dispenser is enclosed to the extent that seed is generally not able to escape the apparatus, the dispenser will also have wide application both indoors and outdoors as a clean and tidy means for dispensing seed to pets. Furthermore, since the apparatus is easily disassembled it may be regularly cleaned with water.

Figure 6:
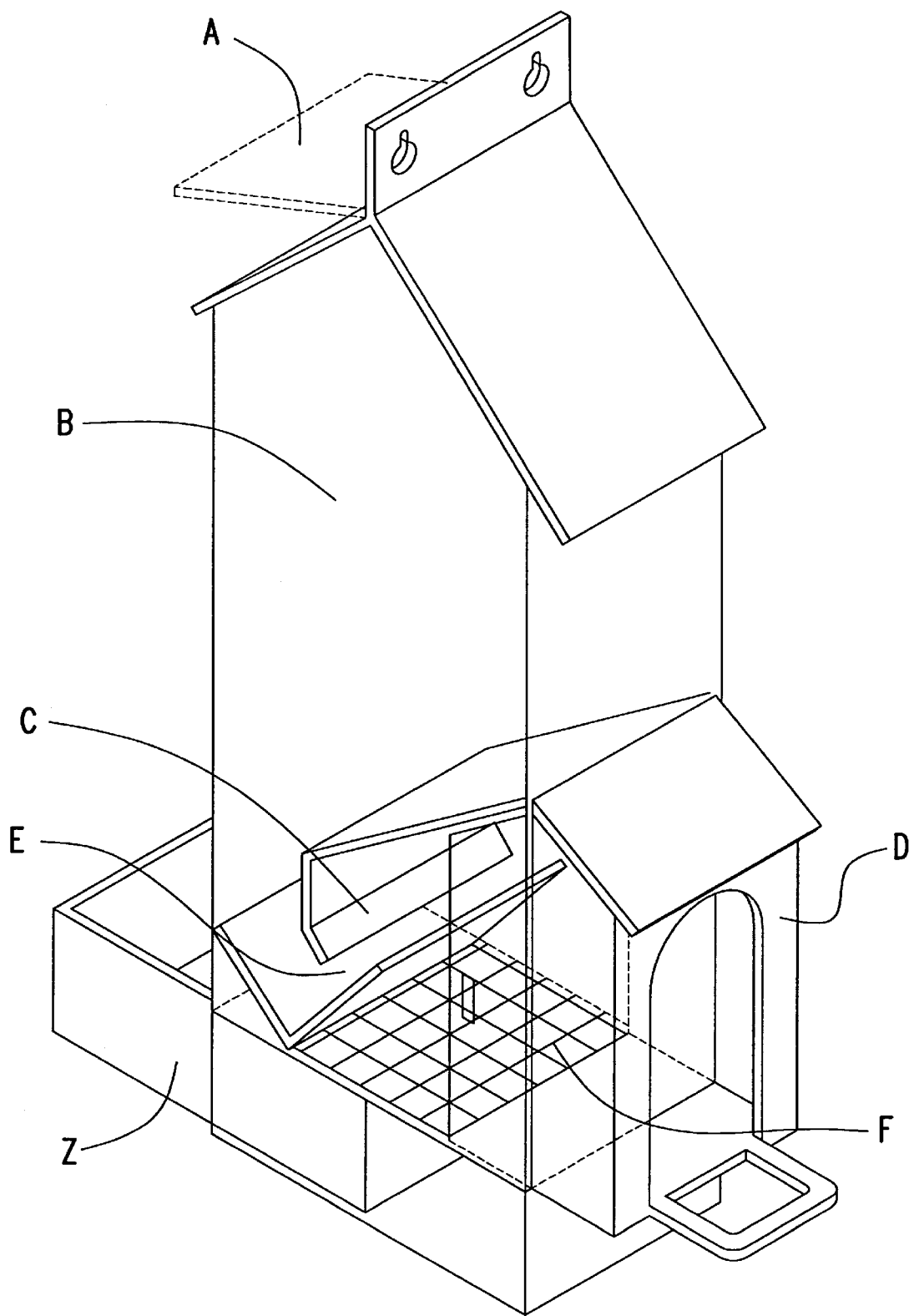
FIG. 6 is an alternative embodiment of the dispensing means.

FIG. 6 illustrates a further embodiment of the dispensing means wherein a catchment tray Z is provided below the grid F to catch the mixture of seeds and husks discarded or wasted by the feeding birds.

The dispensing means of FIG. 6 is located apart from the separating means. The contents of tray Z would then be poured into the separating means via a funnel (not illustrated) which regulates the flow of the seed onto the plates of the separation modules (the apparatus will not work if the flow of seeds is excessive). It is preferable that a finer grid is provided at the entry to this funnel to filter out feathers, grasses and other materials that birds may have deposited while feeding. These materials may otherwise obstruct reasonable flow.

It is envisaged that in the case of large aviaries the present dispenser/separator apparatus may be built up into an aggregate of dispensers, either with their own separating and collecting sections, or alternatively with a single larger separating and collecting unit into which the multiple dispensers feed. For small cages it is envisaged that the dispensing section consists of only a porch and trough without the need for a hopper.

The aviary situation may require the modification of the aperture in porch D to restrict only a bird of a certain size entering the feeding area C (because different birds have different dietary requirements).

It should be noted that the dispenser of the present invention could also be used as a feeding station to attract bird life without the confined environment of a cage or aviary. Thus, although it has not been described in the above disclosure, it is envisaged that the seed dispenser will be accompanied by the appropriate means for attaching the unit to all manner of outdoor and indoor structures such as tree branches, fences, walls, windows, shelves, cages or even free standing. Furthermore a drinking facility could easily be added to the dispensing section so as to provide a complete feeding station.

The present embodiments of the invention are most suited for use with either large or small seed types, not both together. However, further embodiments of the invention with several separation modules to perform the separation of differing seed types (e.g. sunflower and millet) could be arranged in linear array to perform complete separation of mixed seeds. Preferably the separation modules for the larger seeds are located at the top of the separation means because smaller seeds will then fall right through to the small seed separation module(s) below.

Figure 7:
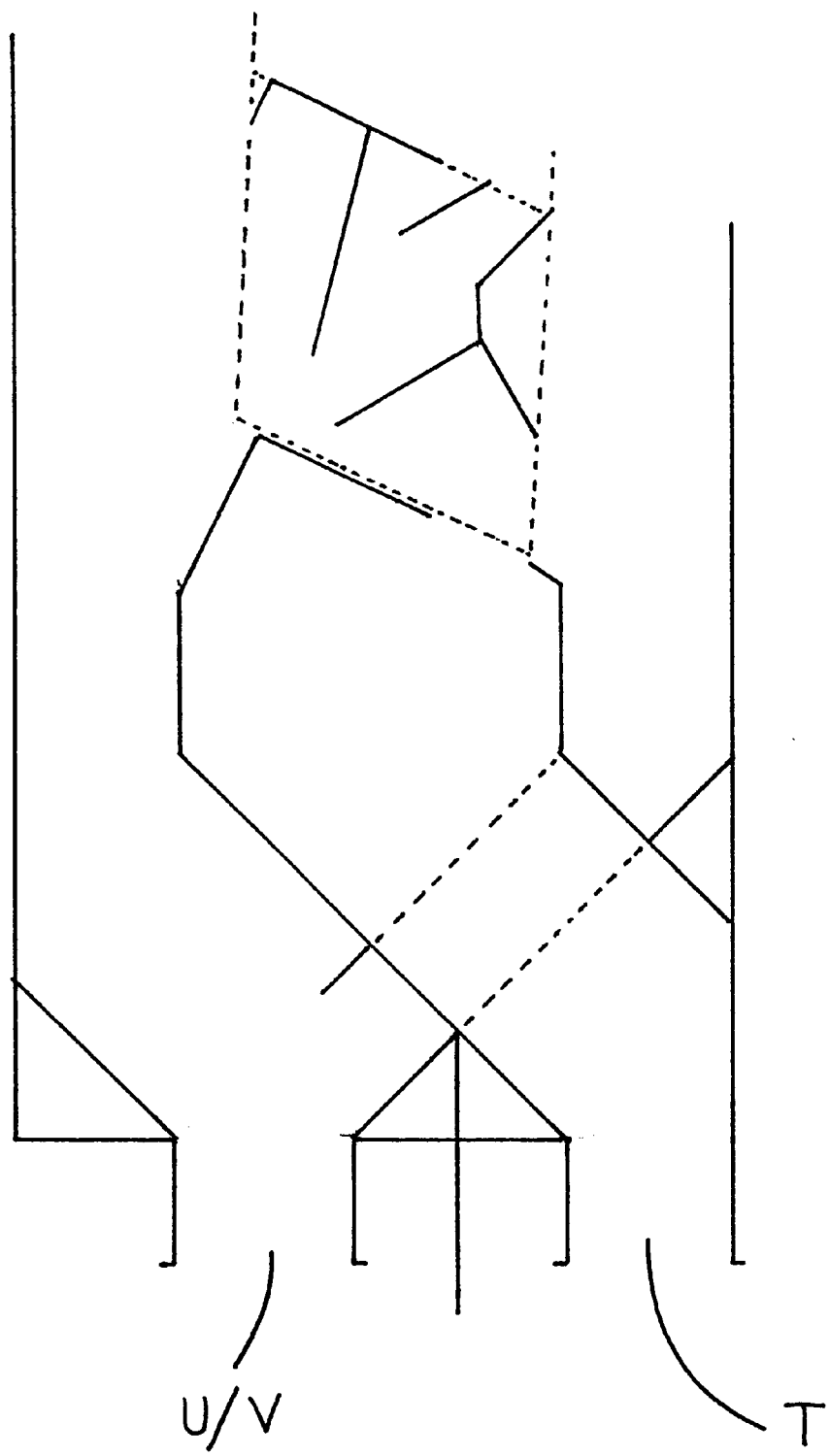
FIG. 7 is an alternative embodiment of the collecting means.

Alternative embodiments of the collection means may also exist. The lower portion of the separating means can be configured to divert the separate husk and seed streams into separate collection containers. This alternative embodiment is illustrated in FIG. 7. The dotted detail shows how the seeds that would normally have landed in chamber V are diverted behind the husk stream (leading to chamber T) to join the other seed stream U. Separate collection containers are then placed under the two exit apertures for seed and husks.

The present invention therefore provides an efficient and effective apparatus for dispensing seed which at the same time saves seed that has not been eaten and would otherwise have been scattered around and wasted.

The embodiments described according to the present invention save up to 80% of seed that would normally be wasted. They also allow an assessment of the kinds of seed the birds are consuming (i.e. which seeds are the most popular) so the diet can be adjusted accordingly

I claim:

1. An apparatus for separating seed from husks comprising:

an inlet through which seed and husk may freely fall, a separating means to receive seed and husk from the inlet, said separating means including at least one separating unit, the at least one separating unit having a series of impact plates wherein a first impact plate is arranged on an incline and a second impact plate is arranged substantially below and at a greater incline to said first impact plate, the first and second impact plates having at least partially overlapping planes, the separating means further including a chute means adjacent the at least one separating unit located to receive seed or husk moving from the at least one separating unit after impact with an impact plate, and a collecting means for collecting separated seed and husks falling through said separating means.

2. The apparatus of claim 1 wherein the construction is substantially transparent.

3. The apparatus of either claim 1 wherein the construction is substantially weather resistant.

4. The apparatus of claim 1 wherein the construction is dismantleable for cleaning.

5. The apparatus claim 1 wherein said separating means is coupled to a dispensing means.

6. The apparatus of claim 5 wherein the dispensing means includes a feeding area having an apertured feeding floor or perch which forms the inlet into the at least one separating unit.

7. The apparatus of claim 6 wherein access means is provided to enable a bird to access the feeding area.

8. The apparatus of claim 7 wherein the dispensing means includes a feed hopper means and feed receiving means to receive feed from the hopper means, the feed receiving means being accessible from the feeding area.

9. The apparatus of claim 5 wherein the dispensing means includes feed hopper means.

10. The apparatus of claim 8 wherein the dispensing means includes feed receiving means disposed to receive feed from the hopper means.

11. The apparatus of claim 1 wherein said apparatus is provided with a dispensing means located apart from the separating means, said dispensing means including a catchment tray below a feeding area to collect a mixture of seeds and husks.

12. The apparatus of claim 1 wherein said collecting means consists of a tray with separate compartments for collecting seed and husks that have fallen through said separating means, said tray being removably engaged below the lowermost end of the separating means.

13. The apparatus of claim 12 wherein said tray compartments can be emptied separately by virtue of their geometric construction.

14. The apparatus of claim 1 wherein a plurality of separating units is provided, each separating unit including an entry and a discharge end with a plurality of impact plates located therebetween.

15. The apparatus of claim 1 wherein there is provided barrier means to prevent seed entering the chute means from re-entering said at least one separating unit.

16. The apparatus of claim 1 wherein the separating means includes a housing in which one or more separating units are removably located.

17. The apparatus of claim 1 wherein a plurality of separating units are stacked end to end in the housing.

18. An apparatus for separating seed from husks comprising:

an inlet through which seed and husk may freely fall, a separating means to receive seed and husk from the inlet, said separating means including at least one separating unit, the at least one separating unit having a series of impact plates wherein a first impact plate is arranged on an incline, a second impact plate is arranged substantially below, reverse to and at a greater incline to said first impact plate, the first and second impact plates having at least partially overlapping planes, the separating means further including a chute means adjacent the at least one separating unit, located to receive seed moving from the at least one separating unit after impact with an impact plate, and a collecting means for collecting separated seed and husks falling through said separating means.

19. The apparatus of claim 18 wherein a third impact plate is arranged reverse to said first impact and between the first and second impact plates.

20. The apparatus of claim 18 wherein the second impact plate is inclined such that husk deflected from the first impact plate will tend to be directed to move further through the at least one separating unit toward a discharge end.

21. The apparatus of claim 18 wherein the at least one separating unit includes at least one further impact plate for engagement by remaining seed and husk rebounding from the second impact plate such that the husk is directed toward a discharge end of the at least one separating unit.

22. The apparatus of claim 21 wherein the collecting means includes a husk receptacle located adjacent the discharge end of the or the last in a series of separating units.

23. The apparatus of claim 22 wherein the receptacle is located within the confines of a larger receptacle in which seed is collected.

24. An apparatus for separating seed from husks comprising:

an inlet through which seed and husk may freely fall, a separating means to receive seed and husk from the inlet, said separating means including a separating unit, the separating unit having a series of impact plates wherein a first impact plate is arranged on a downward incline and a second impact plate is arranged adjacent and in the same downward direction but at a greater downward incline than said first impact plate, the first and second impact plates having at least partially overlapping planes, the separating means further including a chute means adjacent the separating unit, located to receive husk moving from the separating unit after impact with an impact plate, and a collecting means for collecting separated seed and husks falling through said separating means.

* * * * *